United States Patent
Pallauta Pérez et al.

(10) Patent No.: US 11,834,814 B2
(45) Date of Patent: Dec. 5, 2023

(54) DEVICE FOR A SHOWER, CONSISTING OF A HOUSING, A TEMPERATURE CONTROLLER, AN LCD SCREEN, A LED RING, TWO OPENING TAPS; A HOT AND COLD WATER INLET; A THREE-WAY VALVE, A FLOWMETER CONNECTED TO A PUMP; A THERMOSTATIC VALVE, A SERVOMOTOR; AND AN INTEGRATED CIRCUIT CARD; METHOD

(71) Applicant: ECO SHOWER SPA, Calama (CL)

(72) Inventors: Gustavo Alejandro Pallauta Pérez, Antofagasta (CL); Juan Ignacio Mancilla Valenzuela, Antofagasta (CL); Vladimir Antonio Escobar Espinoza, Antofagasta (CL)

(73) Assignee: ECO SHOWER SPA, Calama (CL)

( * ) Notice: Subject to any disclaimer, the term of this patent is extended or adjusted under 35 U.S.C. 154(b) by 141 days.

(21) Appl. No.: 17/600,552

(22) PCT Filed: Mar. 30, 2020

(86) PCT No.: PCT/CL2020/050030
§ 371 (c)(1),
(2) Date: Sep. 30, 2021

(87) PCT Pub. No.: WO2020/198896
PCT Pub. Date: Oct. 8, 2020

(65) Prior Publication Data
US 2022/0170246 A1    Jun. 2, 2022

(30) Foreign Application Priority Data
Mar. 30, 2019   (CL) .................................. 0866-2019

(51) Int. Cl.
*E03B 1/04*     (2006.01)
*E03B 7/04*     (2006.01)
(Continued)

(52) U.S. Cl.
CPC .................. *E03B 1/04* (2013.01); *E03B 7/04* (2013.01); *E03C 1/042* (2013.01); *E03C 1/044* (2013.01)

(58) Field of Classification Search
CPC ................................. E03B 1/04; E03B 7/045
See application file for complete search history.

(56) References Cited

U.S. PATENT DOCUMENTS 5,564,462 A    10/1996  Storch
6,098,213 A *   8/2000  Chu ...................... E03B 1/042
                                                       4/597

(Continued)

FOREIGN PATENT DOCUMENTS

CL    201801253 A1    7/2018
CL   2018001253 A1    7/2018
(Continued)

OTHER PUBLICATIONS

Search Report for related Application No. CL 201900866, dated Dec. 3, 2020, 6 pages.
(Continued)

*Primary Examiner* — Reinaldo Sanchez-Medina
(74) *Attorney, Agent, or Firm* — Procopio, Cory, Hargreaves & Savitch LLP

(57) ABSTRACT

A water recirculating device, liter counter, and temperature regulator for showers, which allows the user to predetermine the water temperature required for any bathroom having cold water network and hot water network, whereby any water below the predetermined temperature is recirculated passing through the boiler of the house until it reaches the (Continued)

temperature preset in the device, wherein said device is composed of a housing, a temperature regulator, an LCD display, a LED ring, two water valves; a hot and cold water inlet; a three-way valve; a flowmeter connected to a pump; a thermostatic valve; a servomotor; and an integrated circuit board; and a method.

15 Claims, 3 Drawing Sheets

(51) Int. Cl.
*E03C 1/042* (2006.01)
*E03C 1/044* (2006.01)

(56) References Cited

U.S. PATENT DOCUMENTS

| | | | |
|---|---|---|---|
| 11,193,259 | B2* | 12/2021 | Searcy .................. G01K 11/12 |
| 2011/0146800 | A1 | 6/2011 | Jallon et al. |
| 2011/0168266 | A1 | 7/2011 | Fiora |
| 2012/0061483 | A1 | 3/2012 | Lee |
| 2012/0266961 | A1* | 10/2012 | Holmes .................. E03B 7/045 |
| | | | 137/1 |
| 2013/0026242 | A1* | 1/2013 | Cuervo-Arango Y De |
| | | | Cachavera .............. E03B 7/045 |
| | | | 236/12.11 |
| 2019/0093904 | A1* | 3/2019 | Cuervo-Arango Y De |
| | | | Cachavera .............. F24D 17/00 |
| 2019/0170371 | A1 | 6/2019 | Johnson |
| 2020/0263400 | A1* | 8/2020 | Song .................. G05D 23/1393 |

FOREIGN PATENT DOCUMENTS

| | | |
|---|---|---|
| EP | 2687788 A1 | 1/2014 |
| EP | 3394352 A1 | 10/2018 |
| ES | 2372055 T3 | 1/2012 |
| ES | 1 078 028 U | 11/2012 |
| ES | 2607058 T3 | 3/2017 |
| FR | 2982623 A1 | 5/2013 |
| KR | 100688032 B1 | 2/2007 |
| KR | 20150117008 A | 10/2015 |
| WO | 2008123785 A1 | 10/2008 |
| WO | 2011078892 A1 | 6/2011 |
| WO | 2017082960 A1 | 5/2017 |
| WO | 2017111593 A1 | 6/2017 |

OTHER PUBLICATIONS

Examination Report for related Application No. CL 201900866, dated Dec. 3, 2020, 32 pages.
Notice of Acceptance for related Application No. CL 201900866, dated Apr. 2, 2021, 6 pages.
Response to Examination Report for related Application No. CL 201900866, dated Oct. 8, 2020, 34 pages.
Search Report for related CL Application No. 201900866 dated Dec. 3, 2020—English Language Translation (3 pages).
Examination Report for related CL Application 201900866 dated Dec. 3, 2020—English Language Translation (14 pages).
Notice of Acceptance for related CL Application No. 201900866 dated Apr. 2, 2021—English Language Translation (3 pages).
Response to Examination Report with Amended Claims for related Application No. 201900866 dated Oct. 8, 2020—English Language Translation (16 pages).

* cited by examiner

DEVICE FOR A SHOWER, CONSISTING OF A HOUSING, A TEMPERATURE CONTROLLER, AN LCD SCREEN, A LED RING, TWO OPENING TAPS; A HOT AND COLD WATER INLET; A THREE-WAY VALVE, A FLOWMETER CONNECTED TO A PUMP; A THERMOSTATIC VALVE, A SERVOMOTOR; AND AN INTEGRATED CIRCUIT CARD; METHOD

CROSS-REFERENCE TO RELATED APPLICATION

This application is a U.S. National Stage entry of PCT Application No: PCT/CL2020/050030 filed Mar. 30, 2020, which claims priority to Chilean Application No: 0866-2019 filed Mar. 30, 2019, the contents of which are incorporated herein by reference.

The present application is directed to a water recirculating device, liter counter, and temperature regulator, which is attached to the shower wall, adaptable to any type of bathroom having hot and cold water circuits, in which the user can preset the desired temperature before turning on the faucet, in order to avoid wasting water at the beginning and during the shower due to temperature changes. Any water below the temperature desired by the user is recirculated through the same drinking water network, passing again through the boiler of the house until it reaches the temperature preset by the user, keeping the device at a constant temperature during the shower through a thermostatic valve, which will ensure that the user is not at risk of burning or feeling cold during the shower time, thus considerably saving water and money. The device contains an LCD screen on which the water temperature is displayed and that also indicates how much water is saved and how much money is spent in each shower. In addition, the device indicates by LED light the water temperature, showing the user through the changing colors of the light whether the water is at the desired temperature.

STATE OF THE ART

Document ES2372055T3 discloses a water saving installation, device, and method, consisting of a recirculation system composed mainly of a device attached to the shower faucet and other devices connected to the cold water circuit. When the user requires hot water for showering, the device attached to the faucet causes a button to connect the cold water circuit with the hot water circuit, which activates a recirculation pump and a timer through a pressure switch, causing no water to flow from the faucet until the timer time runs out. All this water, according to the document, is accumulated in an auxiliary receptacle, or in case of using a boiler, it can be re-deposited in said place.

However, in order to make this process efficient, and for the water to not come out of the faucet until the water temperature is the one desired by the user, the timer must be synchronized in each place to be installed, according to the waiting time required to heat the water. So, the waiting time for hot water is different if there are two or more bathrooms since the distance from the faucet in each bathroom is different with respect to the water heater or boiler.

Finally, the user has no way of knowing what the temperature of the water is. According to the document, the waiting time for the hot water is determined by a timer, which must be synchronized by the user, which means that it is not precise as to when the hot water comes out, since there may be climatic factors that alter the ambient temperature of the water and cause the water to come out cold in the shower or, on the contrary, it may come out hotter than the user has intended to at the end of the timer, which will cause water to be wasted at the beginning and during the shower, since changes in water temperature due to pressure drops will force the user to repeat the action again.

The document ES1078028U discloses a device that is coupled to the domestic water outlets that aims to count the liters of water consumed and calculate the cost thereof, so that the user has sufficient data to control the water consumption made in the domestic and professional field.

Although this device has the characteristic that it can calculate, in economic terms, the liters of water consumed, it does not have the feasibility to save water, but rather to make the user aware of how much water and how much money is spent when opening a faucet. It also does not have the capacity to regulate the water temperature, nor does it indicate the user the temperature of the water.

The present application has an advantage over the previous documents since the first document does not ensure that the water that will exit to the shower will be at the temperature desired by the user, which will lead to water wasting if the user needs to regulate the water again, either because it came out at a very high temperature or at a very low temperature, and it has an advantage over the second document, since it does not produce an effective water saving, but rather quantifies how much water is spent, translated at the same time in economic terms.

The solution proposed in the present application, a device adaptable to any bathroom with cold water network and hot water network circuits, which allows to recirculate the cold water lost at the beginning of the shower through the same drinking water network of the house, passing again through the home boiler until it reaches the temperature desired by the user, is of vital importance in times where water scarcity is a global problem.

The device consists of a housing containing a system of pipes connected to a series of components on the inside, and the outlets of which are connected to the hot water mains and the cold water mains. On the front part of the housing there is a temperature regulator and an LCD display, which shows the preset temperature, the liters of water saved, and the liters of water used. In addition, a LED ring is displayed, which changes color according to the water temperature. Inside the device, a temperature sensor is located in the hot water network, followed by a three-way valve. This valve is attached to a servomotor that rotates its control knob by 180°, diverting the water according to its temperature. One pipe connects to a flowmeter that measures how much water is saved and is connected to a recirculation pump when the water temperature is lower than the users preset temperature, returning the water back to the house boiler. When the water temperature is higher than the preset temperature, it passes through the other pipe that is connected to the hot water inlet of a thermostatic valve, mixing with the cold water that connects to the other pipe that is connected to the inlet of the cold water network of the house, allowing the water with the temperature preset by the user to pass through a third pipe of the thermostatic valve. The thermostatic valve mixes the cold water with the hot water, releasing the water at a temperature depending on the rotation position of the control knob of the thermostatic valve. This is possible because the temperature regulator located on the front of the housing activates another servomotor that is attached to the control knob of the thermostatic valve, causing it to rotate in proportional degrees as the temperature regulator knob is turned. The tempered water coming out of the thermostatic valve passes through another flowmeter that measures how many liters of water are used in the shower, arriving at two water valves, one connecting the outlet to the shower hose, and the other connecting to the fixed shower head. The temperature sensor, servomotors, flowmeters, LCD display, LED ring, and temperature controller are interconnected to an integrated circuit board, which is powered through the house power supply.

The advantages of the device are that, once the device is turned on, the desired temperature can be preset by the user, it recirculates all water that does not meet the preset temperature, and makes only the tempered water set by the user to flow.

The LCD display shows the desired temperature, the number of liters of water saved, and the number of liters of water used in a shower. In addition, a LED ring indicates through colors when the water temperature has reached the temperature preset by the user, opening the water valves without running the risk of getting burned or feeling cold at the beginning and during the shower, since the thermostatic valve keeps the temperature constant in case of low pressure.

DETAILED DESCRIPTION OF THE INVENTION

Figure 1:
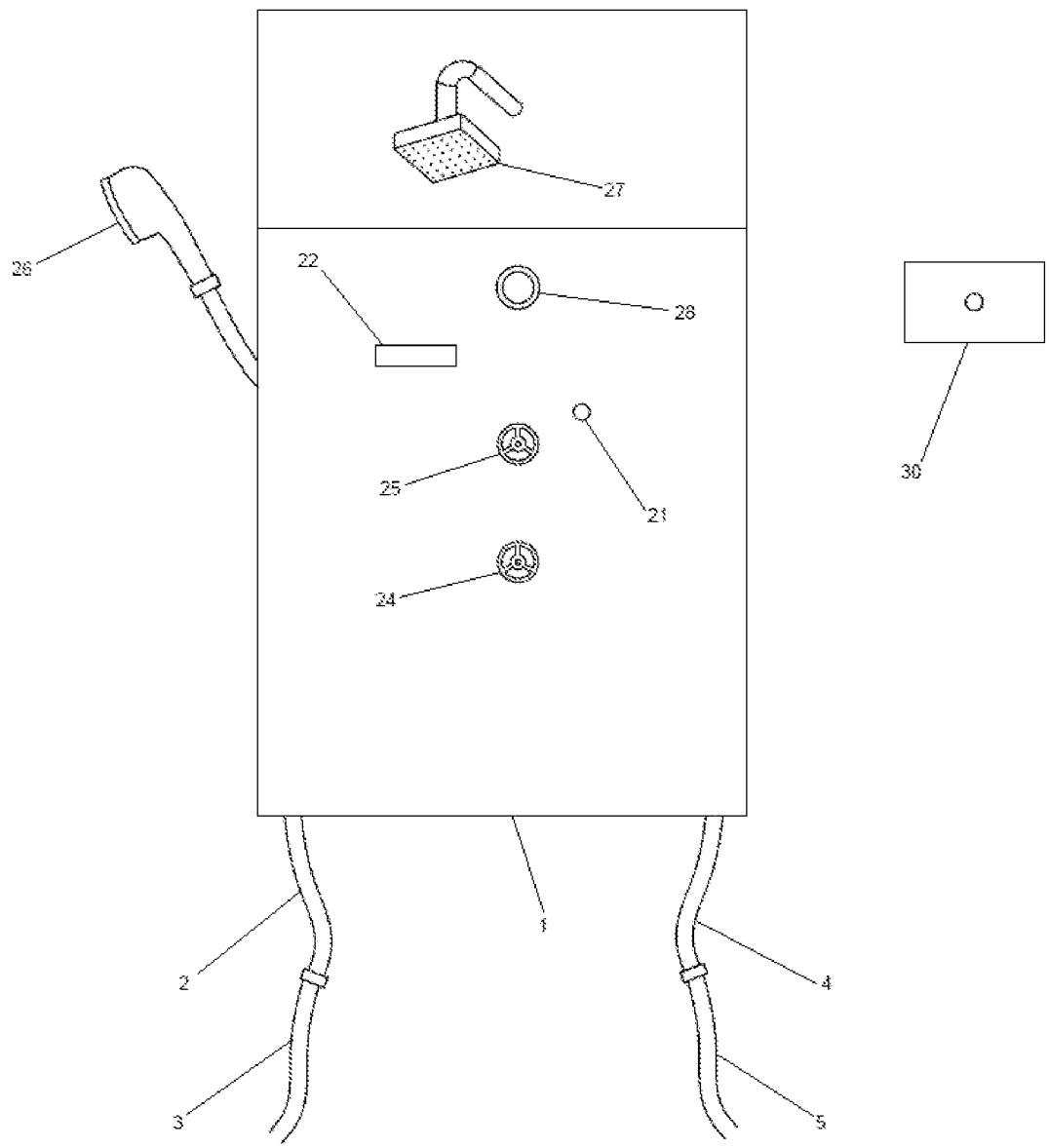
FIG. 1: Depicts a front view of the housing of the present application with the connections to the hot water mains and cold water mains.
Figure 2:
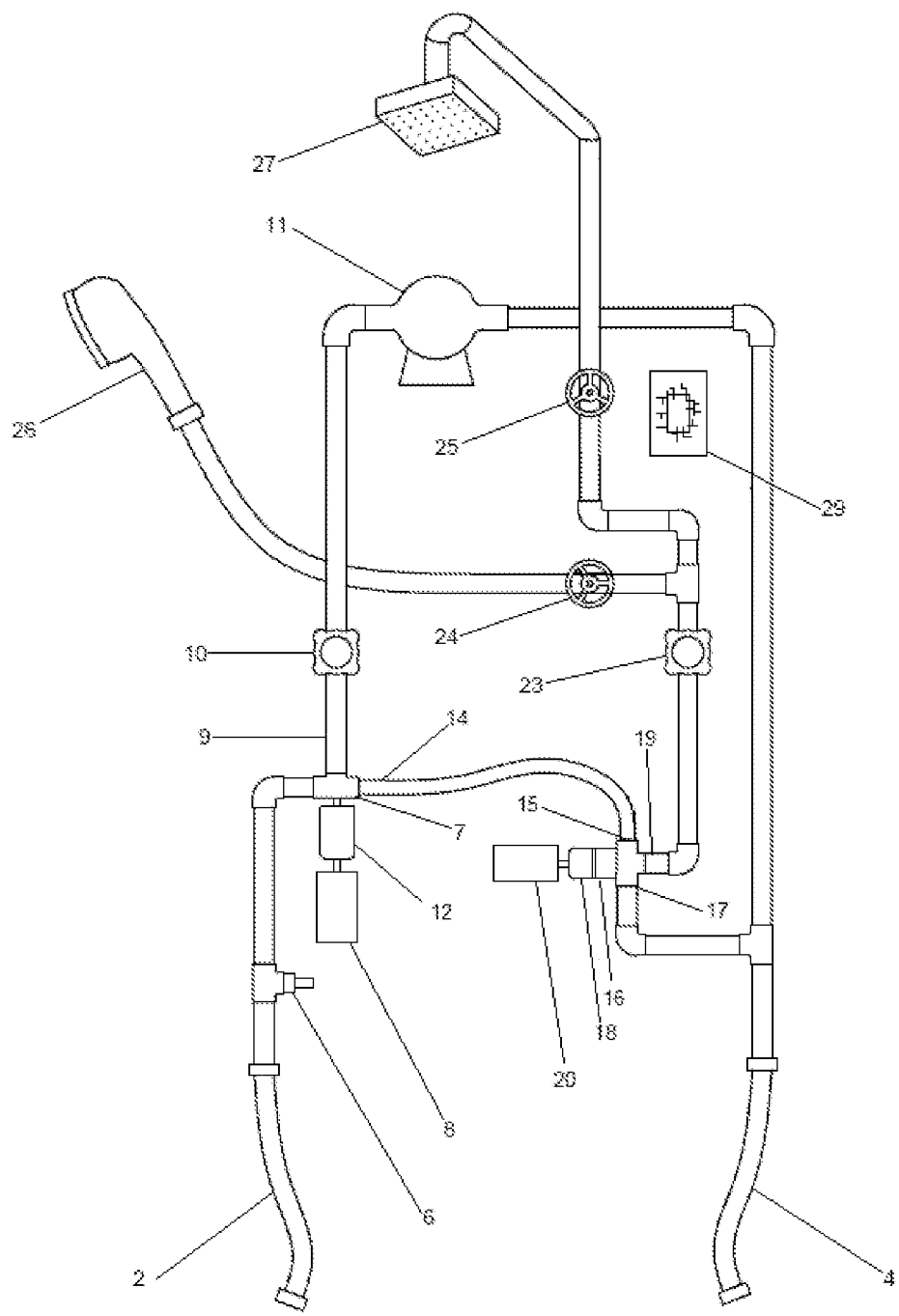
FIG. 2: Depicts an inside view of the housing of the present application containing the piping system connected to the series of components.
Figure 3:
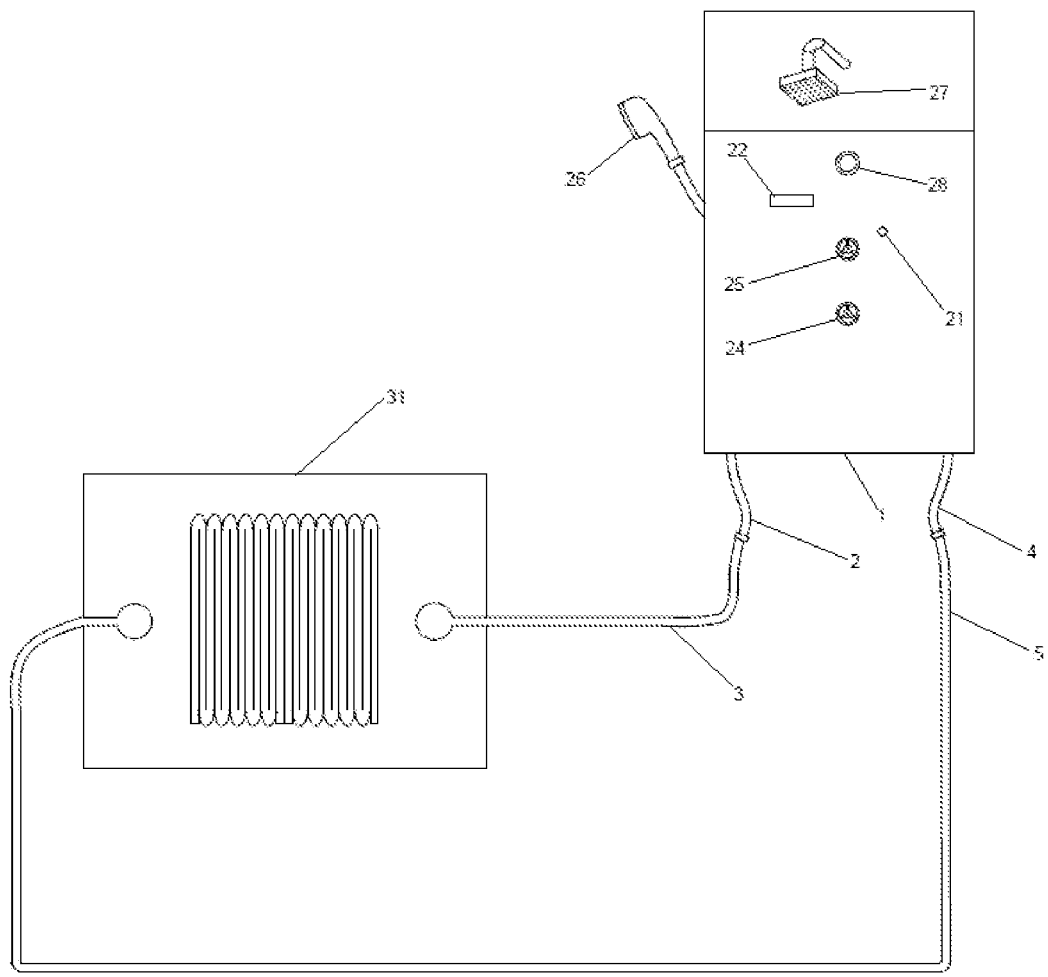
FIG. 3: Depicts a front view of the housing of the present application connected to the schematic water heating circuit of a house.

The described water recirculating device, liter counter, and temperature regulator that recirculates all water below the temperature preset by the user, is composed of a housing (1), which constitutes the main body containing the piping system and the mechanism to which the remaining components of the device are attached. The housing (1) contains in the lower left part of its cavity the hot water inlet (2), coming from the hot water network (3) of the house, and in the lower right part of its cavity the cold water inlet (4), coming from the cold water network (5) of the house. FIG. 2 describes the connection of the piping system and components inside the housing (1), wherein the hot water inlet (2) is connected to a temperature sensor (6), continuing this connection to a three-way valve (7). This three-way valve (7) is attached in its control knob (12) to a servomotor (8), whose function is to rotate the control knob (12) of the three-way valve (7) by 180°. From this point, there are two ways to continue. When the servomotor rotates to 180°, it enables the pipe (9) which follows its connection to a flowmeter (10), whose function is to measure how many liters of water circulate and are below the preset temperature measured by the temperature sensor (6), recirculating through a pump (11) this water back to the boiler (31) of the house through the cold water network (5) and returning the water to the device through the hot water network (3) described in FIG. 3. Once the temperature sensor (6) detects that the water temperature exceeds the temperature preset by the user, the servomotor (8) rotates to 0°, disabling the pipe (9) and deactivating the pump (11), enabling the pipe (14) that directs the water to the hot water inlet (15) of the thermostatic valve (16), and at the same time, the water coming from the cold water network (5) is redirected to the cold water inlet (17) of the thermostatic valve (16). The control knob (18) of the thermostatic valve (16) allows to regulate the temperature of the water coming out of the pipe (19) by rotating on its axis according to the rotation made by the servomotor (20) which is attached to the control knob (18). The rotation of the servomotor (20) is activated in proportion to the rotation of the temperature regulator (21) that is exposed on the front part of the housing (1), which is activated by the user according to the desired temperature to be preset. The water coming out of the pipe (19) has the temperature set by the user, wherein said temperature is displayed on an LCD screen (22), indicating how many liters of water are saved, measured by the flowmeter (10), and indicating how many liters are used, measured by the flowmeter (23) that connects the water to the water valve (24) and the water valve (25). When the water valve (24) is opened, water is supplied to the handheld shower head (26), and when the water valve (25) is opened, water is supplied to the fixed shower head (27). The user can tell when the water flows at the preset temperature by means of colors emitted by an LED ring (28) displayed on the front part of the housing (1). Blue, when the water temperature is lower than the preset temperature, and green, when the water temperature is higher than the preset temperature. The temperature sensor (6), servomotor (8), flowmeter (10), pump (11), servomotor (20), flowmeter (23), temperature controller (21), LCD display (22), and LED ring (28) are interconnected to an integrated circuit board (29) programmed to measure and activate the aforementioned components. The integrated circuit board (29) is turned on and off through a switch (30) located outside the device and attached to the wall.

The invention claimed is:

1. A water recirculating system, characterized in that, said system is composed of a housing (1) and constitutes a main body, which includes following components: a) a temperature regulator (21), an LCD display (22), a LED ring (28), and two water valves (24 and 25); b) a hot water inlet (2), which is connected on the inside of the housing to a temperature sensor (6) that connects to a three-way valve (7) containing a first control knob (12) that is attached to a first servomotor (8) that rotates the first control knob (12) by 180°; at 180°, it diverts water to a first pipe (9) connecting to a first flowmeter (10), which is connected to a recirculation pump (11); at 0° it diverts the water to a second pipe (14) connecting to the hot water inlet (15) of a thermostatic valve (16); and c) a cold water inlet (4) that connects to a cold water inlet (17) of the thermostatic valve (16) and connects to the recirculation pump (11); a second control knob (18) of the thermostatic valve (16) is attached to a second servomotor (20); a pipe (19) of the thermostatic valve (16) connects to a second flowmeter (23) and the water valves (24 and 25); wherein all the components are interconnected to an integrated circuit board (29), contained inside the housing (1).

2. The water recirculating system, according to claim 1, characterized in that the housing (1) contains the hot water inlet (2) in a lower left part, which connects to a hot water network (3) of a house; also, the housing (1) contains the cold water inlet (4) in a lower right part, which connects to the cold water network (5) of the house.

3. The water recirculating system, according to claim 1, characterized in that the three-way valve (7) and the first servomotor (8) may be replaced by two solenoid valves (9 and 14) for opening and closing the pipes (9) and (14).

4. The water recirculating system, according to claim 1, characterized in that the LCD display (22) displays the liters of water measured by the first flowmeter (10), and displays liters of water measured by the second flowmeter (23).

5. The water recirculating system, according to claim 4, characterized in that the LCD display (22) shows the temperature preset by a user through the temperature regulator (21).

6. The water recirculating system, according to claim 1, characterized in that the temperature regulator (21) is a potentiometer which contains a knob for regulating the temperature.

7. The water recirculating system, according to claim 6, characterized in that the second control knob (18) of the thermostatic valve (16) is attached to the second servomotor (20) that rotates on its axis in proportion to the rotation made by a user of the knob of the temperature regulator (21).

8. The water recirculating system, according to claim 6, characterized in that the temperature regulator (21) may be replaced by buttons representing different temperature ranges.

9. The water recirculating system, according to claim 1, characterized in that the LED ring (28) represents through colors the water temperature measured by the temperature sensor (6).

10. The water recirculating system, according to claim 1, characterized in that the two valves have a first water valve (24) that connects to a handheld shower head (26), and a second water valve (25) that connects to a fixed shower head (27).

11. The water recirculating system, according to claim 2, characterized in that the recirculation pump (11) returns the water to a boiler (31) through the cold water network (5), reintegrating the water to the system through the hot water network until the temperature sensor (6) detects that the water temperature is higher than the one predetermined by a user.

12. The water recirculating system, according to claim 1, characterized in that the system may be turned on wirelessly via an application on mobile devices.

13. The water recirculating system, according to claim 1, characterized in that the thermostatic valve (16), through the second control knob (18), regulates the temperature preset by a user.

14. The water recirculating system, according to claim 13, characterized in that the thermostatic valve (16) may be replaced by a water mixing valve.

15. A method for obtaining a water recirculating system, characterized in steps of: a) constructing a housing (1) that attaches to a shower wall and that constitutes a main body, adhering to its front part a temperature regulator (21), an LCD display (22), a LED ring (28), and two water valves (24 and 25); b) inserting a hot water inlet (2) and then connecting on the inside of the housing to a temperature sensor (6), connecting a three-way valve (7) having a first control knob (12) that is attached to a first servomotor (8) which rotates the first control knob (12) by 180°; c) at 180°, diverting water to a first pipe (9) connecting to a first flowmeter (10) connected to a recirculation pump (11); d) at 0°, diverting the water to a second pipe (14) connected to a hot water inlet (15) of a thermostatic valve (16); e) inserting a cold water inlet (4) to the housing and screwing it to a cold water inlet (17) of the thermostatic valve (16), connecting the cold water inlet (4) also to the recirculation pump (11); attaching a second control knob (18) of the thermostatic valve (16) to a second servomotor (20); f) connecting a pipe (19) of the thermostatic valve to a second flowmeter (23) and the two water valves (24 and 25); the components in steps a)-f) are interconnected to an integrated circuit board (29) by inserting it inside the housing (1); and connecting the integrated circuit board (29) to a switch (30).

* * * * *